United States Patent

Tuzmen et al.

Patent Number: 5,613,542
Date of Patent: Mar. 25, 1997

[54] LAMINATED LOUVER FOR A BLIND

[75] Inventors: Zeki Tuzmen, Irvine; Julius F. John, Redondo Beach; Richard A. Setele, Newbury, all of Calif.

[73] Assignee: Newell Operating Company, Rockford, Ill.

[21] Appl. No.: 273,886

[22] Filed: Jul. 12, 1994

[51] Int. Cl.$^6$ ........................................ E06B 9/00
[52] U.S. Cl. ................................................ 160/236
[58] Field of Search ........................ 160/236, 235, 160/168.1 R, 168.1 V, 173 R, 173 V, 166.1 R, 900, 107, 19, 172 R, 172 V, 199

[56] References Cited

U.S. PATENT DOCUMENTS

| | | |
|---|---|---|
| 2,784,630 | 3/1957 | Koprow et al. . |
| 3,615,970 | 10/1971 | May . |
| 4,049,038 | 9/1977 | Hyman et al. . |
| 4,128,689 | 12/1978 | Heaps et al. . |
| 4,195,680 | 4/1980 | Hyman et al. ............... 160/900 X |
| 4,348,444 | 9/1982 | Craig . |
| 4,385,954 | 5/1983 | Pauls et al. . |
| 4,434,834 | 3/1984 | Ennes ........................ 160/900 X |
| 4,842,036 | 6/1989 | Goodman .................... 160/236 |
| 4,877,077 | 10/1989 | Ebert ......................... 160/236 |
| 4,884,616 | 12/1989 | Setele ........................ 160/236 |
| 4,913,216 | 4/1990 | Lemay ...................... 160/900 X |
| 4,915,763 | 4/1990 | Swiszcz . |
| 4,925,512 | 5/1990 | Briand . |
| 4,936,937 | 6/1990 | Burns et al. . |
| 5,049,438 | 9/1991 | Chen . |
| 5,086,823 | 2/1992 | Danchulis et al. ............ 160/236 |
| 5,141,042 | 8/1992 | Schwaegerle ................ 160/236 |
| 5,269,361 | 12/1993 | Ryden et al. ................. 160/236 |
| 5,273,781 | 12/1993 | Shu . |
| 5,281,290 | 1/1994 | Bosler . |

FOREIGN PATENT DOCUMENTS

8907314 U  8/1989  Germany .

*Primary Examiner*—David M. Purol
*Attorney, Agent, or Firm*—Foley & Lardner

[57] ABSTRACT

A laminated louver (10) is disclosed comprised of a cover (31), adhesive (32) and main body (12). The louver (11) is first extruded (112) with flanges (16) and passed through pressure rollers (117) along with the covering material (31) wherein the flanges (16) capture the covering material (31).

5 Claims, 1 Drawing Sheet

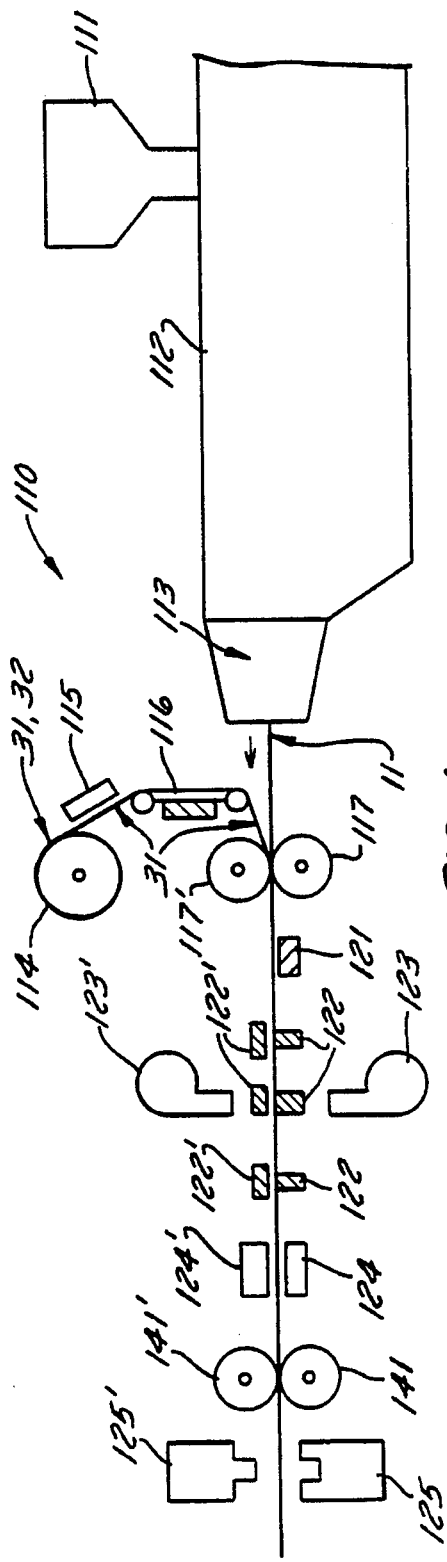
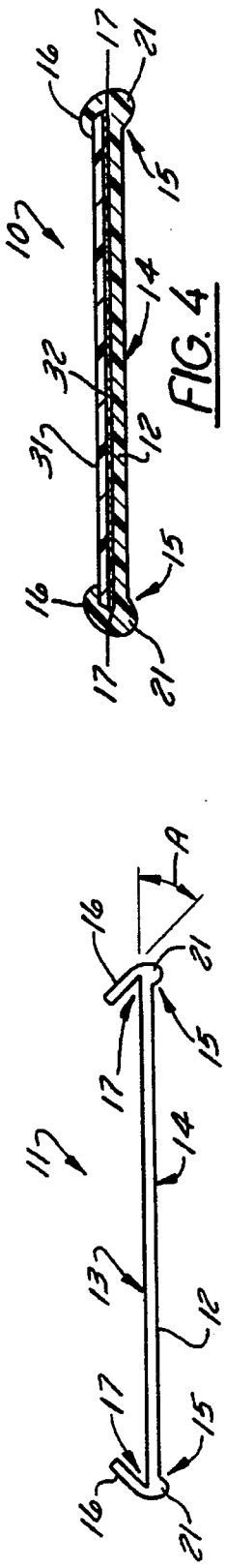
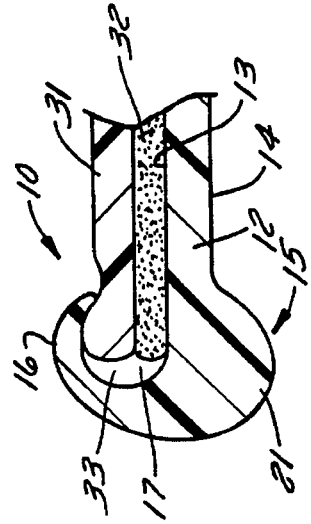
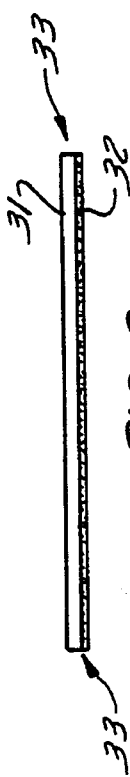

LAMINATED LOUVER FOR A BLIND

TECHNICAL FIELD

The present invention relates to louvers for blinds, and more particularly, to a laminated louver for a blind, including the apparatus and the method for making the louver.

BACKGROUND OF THE INVENTION

The advent of vertical and horizontal louver type blinds has brought about new concepts in interior design in commercial and residential installations. Vertical louver type venetian blind systems have been particularly well received in contemporary architecture where relatively large expanses of window glass are employed or large room partitions are desired. The vertical louver blind may be of substantial vertical height and, when closed, may extend along a considerable horizontal length to cover a wall, a window, or to partition a room.

Conventional louvers, also called slats or vanes, of a vertical blind are adapted for lateral movement between an open blind position, when the blind is drawn to one or opposite ends of a support track or channel adjacent their tops, and a closed position, when the louvers are positioned in generally equal spaced relation to one another along the length of the support track or channel. The louvers are also adapted for selective rotation about their longitudinal axes between open and closed positions when in the closed blind position, to control the amount of light entering between the louvers into or out of the adjacent room.

The vertical louvers may be made of vinyl or other suitable material, colored to add an accent color to the room or colored to blend with the primary color of the room. The louvers may also be made or covered with a fabric material to achieve a specific design effect. For example, U.S. Pat. No. 4,049,038 issued to Hyman, Cayton and Rosenquist and assigned to LOUVERDRAPE, INC. discloses a functional and decorative covering material, such as wallpaper or reflective materials, for louvers, where the materials are held from sliding longitudinally along each louver at a single attachment point. A backing material of rigid construction, e.g., heavy grade paper or cardboard, is attached to the covering material and placed in interlocking relationship with opposed inwardly projecting, longitudinal louver flanges. A single spot of glue may then be used to keep the composite cover with backing attached to the slat.

This louver system enables one to easily customize and change the covering materials on the louvers. The assembly of a complete louver system is fabricated after the louvers are individually covered with the desired functional or decorative covering material involved.

To improve the system, save money on materials, and give the louvers a more finished look, it is desirous to attach the cover directly on each louver. Unfortunately, because two different materials are used to make the louvers, that being for the cover and the slat, and because during the construction and use of the louvers they are exposed to a wide range of temperatures and humidities, the cover and slats can expand and contract at different rates, causing distortion and wrinkling if the coefficient of expansion thereof are too dissimilar. Accordingly, there is a need for an aesthetically pleasing louver with the cover attached directly to each louver slat wherein the covered louver can withstand fluctuations in temperature and humidity without distortion or wrinkling and without the need to match the coefficient of expansion of the louver slat and cover materials.

SUMMARY OF THE INVENTION

The present invention is such a assembly. According to a first aspect of the present invention, a method for laminating a cover to a louver slat is disclosed that includes the steps of first extruding a louver slat strip of an overall length to make many louver slats for a given louver system. The louver slat strip has a substantially flat body with two parallel longitudinal marginal edges, an upper surface and a lower, opposed surface. Each longitudinal marginal edge of the slat has a flange projecting inwardly and away from the upper surface forming a channel disposed between the upper surface and the flanges above the body of the louver slat. Simultaneously, a cover with two opposed, parallel cover longitudinal marginal edges and a heat activatable adhesive applied preferably to the bottom surface thereof is pulled over aligning means so that the side of the cover with the activated adhesive is positioned directly over the upper surface of the louver slat body and the longitudinal marginal edges of the cover are disposed in the channels between the flanges and the louver slat body. The aligned cover and louver slat are next pulled through a pair of pressure nip rollers wherein the flanges are compressed towards the louver body, capturing the marginal edges of the cover therebetween. Thereafter, the louver slat with the attached cover is cooled and cut to a preselected length.

The louver slat strip with the attached cover may be moved against anti-static bars or in a bath of anti-static material after being cooled.

Accordingly, the louver slat and cover assembly fabricated as described comprises a louver slat having a substantially flat body with two parallel louver longitudinal marginal edges, and in a preferred orientation thereof, an upper surface and a lower surface, each longitudinal marginal edge having a flange projecting inwardly and away from the upper surface to form a channel between the upper surface and the flanges. It also includes a cover having two longitudinal marginal edges disposed on the upper surface of the louver slat with each cover longitudinal marginal edge positioned in the channel and gripped between the bent and compressed flanges and the louver slat body. The adhesive on the cover is disposed between the cover and the louver slat body.

In addition, for strength, each longitudinal marginal edge of the louver slat of the present invention also preferably has a longitudinal bead projecting outwardly from the corner formed by the intersection of each flange and a longitudinal marginal edge and lower surface of the louver slat body. The louver slat is then incorporated into a blind, such as the one disclosed in FIG. 1 of U.S. Pat. No. 4,049,038, which is incorporated herein by reference.

Other advantages and features of the present invention will become apparent upon reading the following description of the drawings and detailed description of the invention.

BRIEF DESCRIPTION OF THE DRAWINGS

In order that the present invention may be more fully understood, it will now be described by way of example, with reference to the accompanying drawings in which:

FIG. 1 is a diagramic view of equipment for carrying out the method of the present invention;

FIG. 2 is a cross sectional view of the louver slat strip after it leaves the die of the extruder;

FIG. 3 is a cross sectional view of the cover before it is laminated to the louver slat strip;

FIG. 4 is a cross sectional view of the laminated louver slat strip and cover; and, FIG. 5 is a detail of a portion of the louver slat strip and cover shown in FIG. 4.

DETAILED DESCRIPTION

FIG. 1 shows the production line apparatus 110 used and method to make the laminated louver 10 of the present invention. At one end of the production line there is a supply hopper or intake 111 which receives the raw thermoplastic material for forming the blank or initial extrusion 11 by an extruder 112. One example of such a material is polyvinyl chloride. The material is fed into an extruder 112 which includes heating means (not shown) for heating the thermoplastic material and an auger or screw for moving the material from the hopper 111 to the output where there is a die 113. The material emerges from the die at a temperature, for example, of about 370° F. and at a rate, for example, of about 30 feet per minute. The die is shaped so that the emerging, continuous, product has a shape as shown by the extrusion 11 in FIG. 2.

Specifically, the extrusion 11 is a louver strip that has a substantially flat main body 12 with opposed surfaces, that being an upper surface 13 and a lower surface 14. The main body has two parallel, opposed longitudinal side or marginal edges 15. Each longitudinal marginal edge 15 has a flange 16 projecting inwardly and away from the upper surface 13 of the main body 12 forming a channel 17 between the upper surface and the flanges. The initial angle A between each flange 16 and the upper surface 13 is about 45 degrees.

For additional strength, each longitudinal marginal edge 15 of the extrusion 11 further includes a longitudinal bead 21 that projects outwardly from the lower surface 14 of the body 12 and each of the corners formed by the intersection of the flange 16 and edge 15.

A supply roll 114 holds a continuous strip of covering material 31 having a width about equal to the width of the extrusion channel 17 to be laminated to the louver. The covering material may be polyester string or blend thereof. The covering material 31 also may have a heat activating adhesive or glue 32 applied to one side thereof (FIG. 3). The cover 31 also has parallel longitudinal marginal edges 33 along the length thereof.

As shown in FIG. 1, the covering material strip 31 and the extrusion 11 are pulled by a plurality of pull rollers 141 located downstream in the production line 110. The covering material 31 is pulled from the roll 114 and heat activatable adhesive is applied by adhesive applying means 32 to one side of the covering material, if not already pre-coated with adhesive. The adhesive is activated on contact by the heat of the extrusion. If the extrusion is not hot enough to activate the adhesive, the cover is passed by a heater 115 or over a preheat drum (not shown) wherein the adhesive is heated to about 260° F. and activated to render it more plastic. From the heater, the continuous strip covering material 31 is passed over and onto conventional aligning means, such as a conventional, photo-cell controlled pivotally mounted strip aligning frame 116 wherein the longitudinal marginal edges 33 of the covering material 31 is aligned with the longitudinal margins of the extrusion 11. In particular, the side of the covering material 31 having the activated glue thereon is positioned so the adhesively coated side thereof is opposite the upper surface 13 of the extrusion body 12 and the longitudinal marginal edges 33 of the covering material 31 are disposed adjacent the bases of the extrusion flange 16 in the extrusion channel 17 formed between each of the flanges 16 and the extrusion body. The assembly is then pulled through a pair of laminating pressure nip rollers 117, 117'. At the nip rollers 117, 117', the flanges 16 are compressed towards the extrusion body 12 capturing the longitudinal marginal edges 33 of the covering material 31 therebetween.

As shown in FIG. 4 and the detail of FIG. 5, at the nip rollers the flanges 16 are crimped to hold the covering material 31 against the upper surface 13 of the extrusion body 12. The adhesive bonds the covering material 31 to the extrusion 11.

In practice, it has been found that the top nip roller 117' can be a non-embossed steel roller and the bottom roller 117 can be a silicon durameter roller. The extrusion 11 can also be embossed at the laminating pressure nip rollers 117, 117' or by separate embossing rollers.

The assembly of the laminated extrusion and covering material 10 is next passed adjacent a cooling block 121 and then to a plurality of conventional after-form plates 122, 122' where the extrusion is shaped to its desired profile, i.e., flat, crowned or S-shaped. The assembly is moved to cooling fans 123, 123' through anti-static bars 124, 124' or in a bath of anti-static material (not shown). It then moves to a cut-off die 125, 125' which cuts the covered extrusion assembly into covered lower slats of a preselected length.

While specific embodiments have been illustrated and described, numerous modifications are possible without significantly departing from the spirit of the invention, and the scope of protection is only limited by the scope of the accompanying claims.

We claim:

1. A louver and cover assembly comprising:

a louver slat having a body with two opposed surfaces and two parallel louver slat longitudinal marginal edges at the longitudinal margins thereof, each longitudinal marginal edge of the louver slat having a flange projecting inwardly and away from one of said surfaces to form a channel between said one surface and the flanges at the longitudinal margins thereof;

a cover having two cover longitudinal marginal edges and a first cover surface and a second cover surface, the marginal edges disposed on the one surface of the louver slat with each cover marginal edge positioned in the channel and gripped between the flanges and the louver slat body;

an adhesive disposed between the first cover surface and the one surface of the louver slat to secure the same together, such that the first cover surface is in substantially complete contact with the one surface of the louver slat; and, wherein each longitudinal marginal edge of the louver slat further includes a longitudinal bead projecting outwardly from the corner formed by the intersection of the flange and marginal edge and lower surface of the louver body.

2. The louver slat as defined in claim 1 wherein each louver slat is incorporated into a blind assembly having a plurality of parallel louver slats.

3. The louver and cover assembly as defined in claim 1 wherein each longitudinal bead is semi-cylindrical.

4. The louver and cover assembly as defined in claim 1 wherein the adhesive is heat activated.

5. The louver and cover assembly as defined in claim 1 wherein the opposed surfaces of the louver slat are curvilinear without any interruption between the longitudinal edges.

\* \* \* \* \*